June 14, 1966  H. C. HUBBARD  3,255,532
MAGNETIC MEASURING APPARATUS
Filed April 4, 1962  4 Sheets-Sheet 1
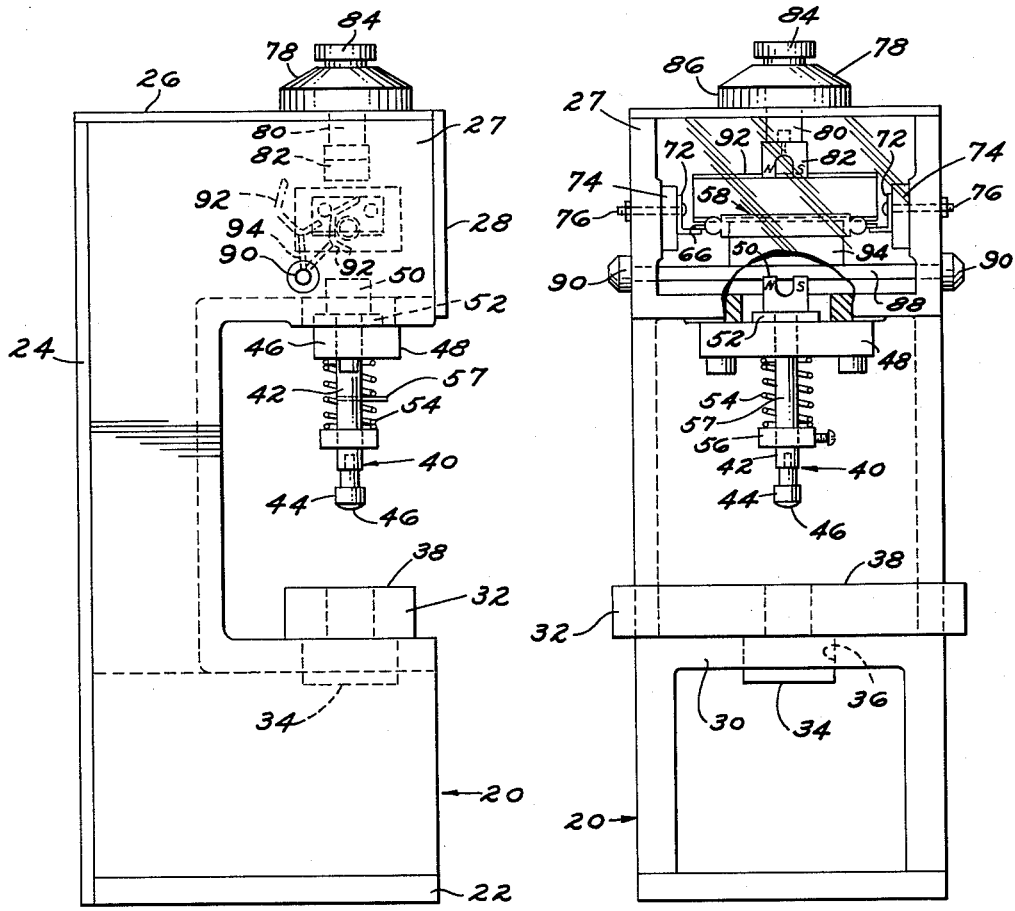
INVENTOR.
HAROLD C. HUBBARD
BY
Barnes, Kisselle, Raisch & Choate
ATTORNEYS June 14, 1966 H. C. HUBBARD 3,255,532
MAGNETIC MEASURING APPARATUS
Filed April 4, 1962 4 Sheets-Sheet 2
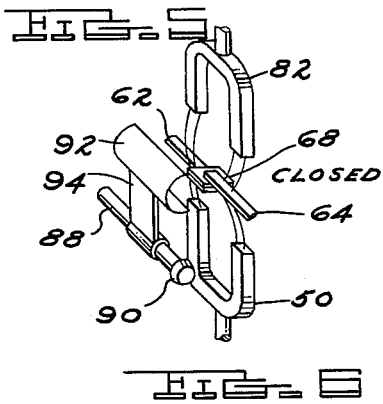
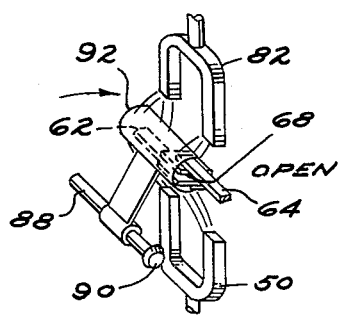
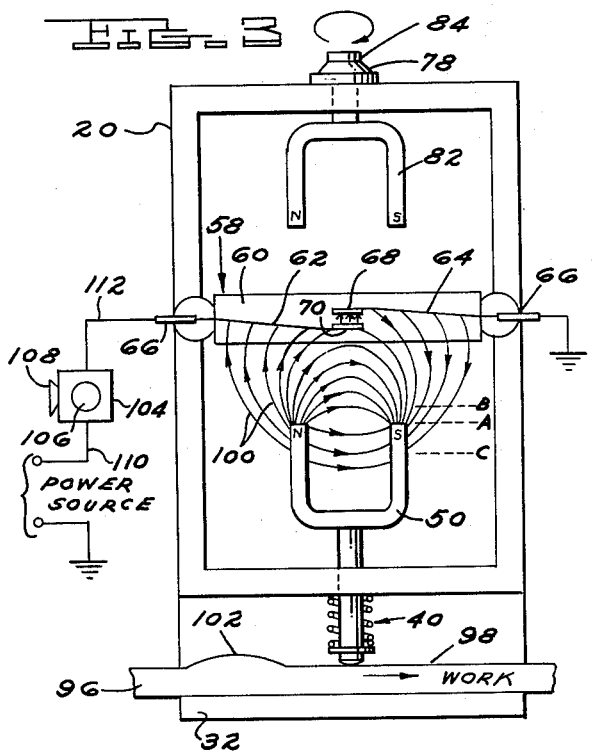
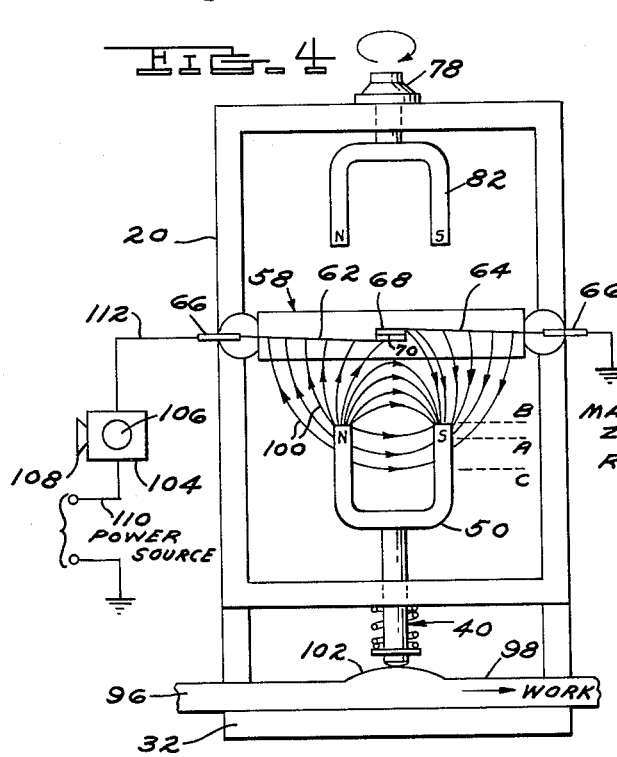
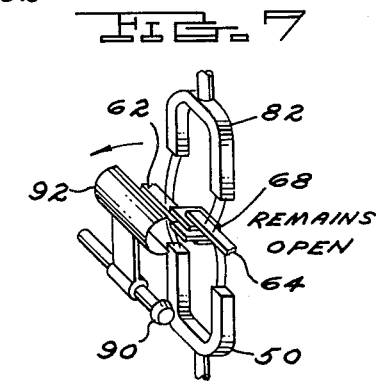
INVENTOR.
HAROLD C. HUBBARD
BY
*Barnes, Kisselle, Raisch, & Choate*
ATTORNEYS June 14, 1966  H. C. HUBBARD  3,255,532
MAGNETIC MEASURING APPARATUS
Filed April 4, 1962  4 Sheets-Sheet 3
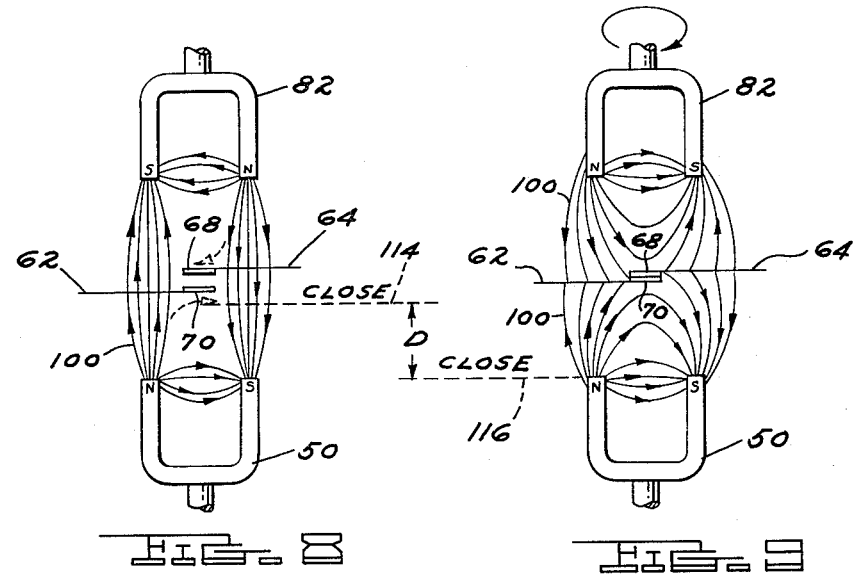
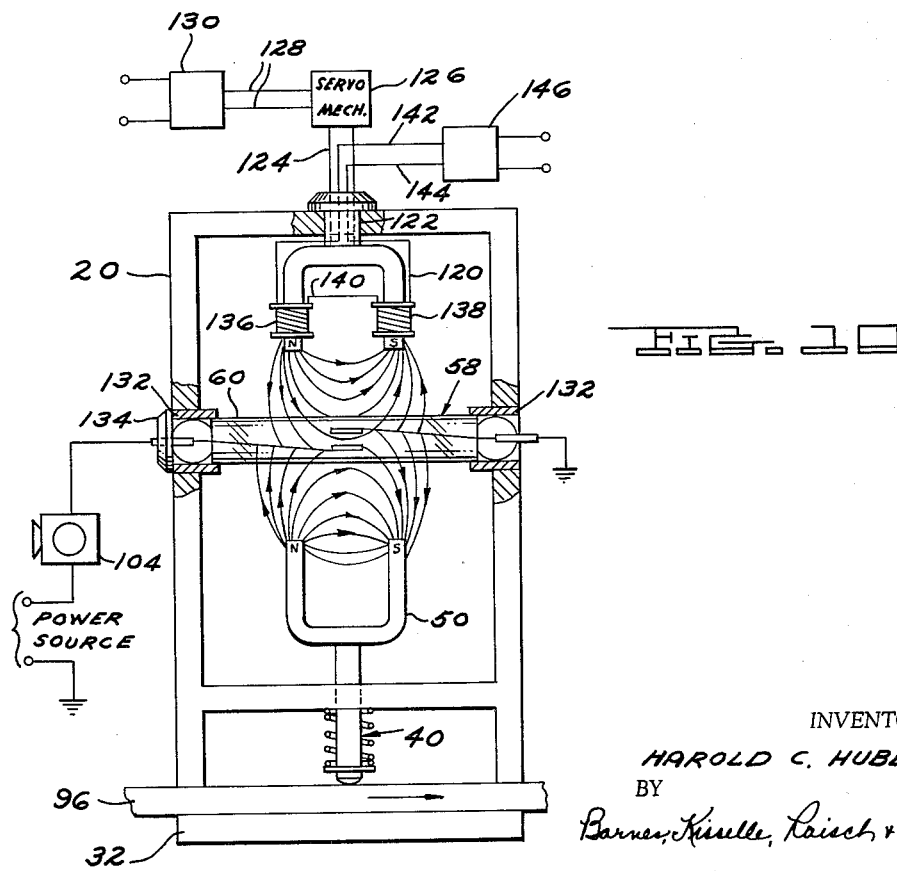
INVENTOR.
HAROLD C. HUBBARD
BY
Barnes, Kisselle, Raisch, & Choate
ATTORNEYS June 14, 1966   H. C. HUBBARD   3,255,532
MAGNETIC MEASURING APPARATUS
Filed April 4, 1962   4 Sheets-Sheet 4
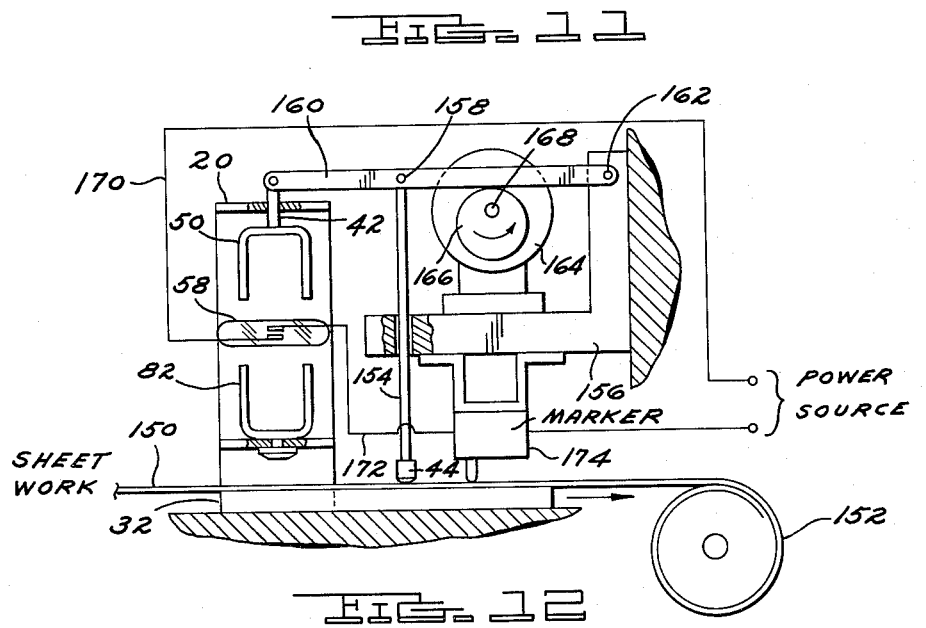
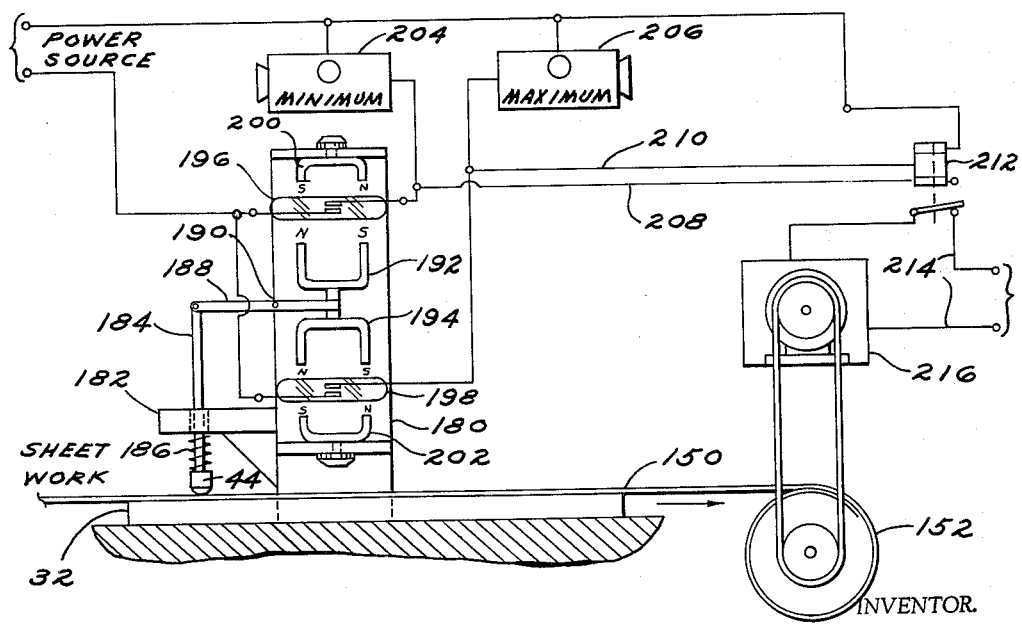
INVENTOR.
HAROLD C. HUBBARD
BY
Barnes, Kisselle, Raisch, & Choate
ATTORNEYS United States Patent Office 3,255,532
Patented June 14, 1966

3,255,532
MAGNETIC MEASURING APPARATUS
Harold C. Hubbard, Lansing, Mich., assignor, by mesne assignments, to Motor Wheel Corporation, Akron, Ohio, a corporation of Ohio
Filed Apr. 4, 1962, Ser. No. 185,102
12 Claims. (Cl. 33—147)

This invention relates generally to measuring apparatus and more particularly to apparatus for measuring a linear dimension of an object.

It is an object of the present invention to provide improved measuring apparatus of simplified construction which is capable of measuring micro dimensions.

Another object is to provide a magnetic micrometer which is capable of sensing minute dimensional variations in an object and which is operable to directly control a relatively high amperage relay connected in an electrical circuit with the micrometer.

A further object is to provide improved measuring apparatus of simplified construction capable of monitoring a dimension of a moving object, such as a ribbon of sheet work or the like, and providing an electrical output which may be utilized to operate a marking apparatus to furnish a visual indication of the occurrence of dimensional runout directly on the moving stock.

Still another object is to provide measuring apparatus of the above character which employs a movable probe which mechanically contacts the object being measured, the movement of the probe causing a magnet to move a proportional distance relative to a magnetic switch operable to close in response to the magnet reaching a predetermined point in its movement toward the switch to thereby close an electrical circuit providing an output correlated with the movement of the probe.

Yet another object is to provide an improved measuring apparatus incorporating a magnetically actuated switch the output of which is a function of both the dimension of the object being measured as well as one or more other variable conditions affecting such dimension.

Other objects, features and advantages of the present invention will become apparent in the following description and drawings in which:

FIG. 1 is a side elevational view of a magnetic measuring device constructed in accordance with the present invention.

FIG. 2 is a front elevational view of the device.

FIG. 3 is a semi-diagrammatic front elevational view of the magnetic measuring device illustrating its condition when the dimension of the work being measured is within a given acceptable range.

FIG. 4 is a semi-diagrammatic view similar to that of FIG. 3 illustrating the condition of the device when the dimension of the work exceeds a maximum specified value.

FIGS. 5, 6 and 7 are semi-diagrammatic perspective views of a switch reset mechanism of the magnetic measuring device illustrating respectively the closed condition of the switch, the reset mechanism moved to an operative position for opening the switch and the reset mechanism returned to its inoperative position with the switch remaining open.

FIGS. 8 and 9 are diagrammatic views illustrating the operation of a control magnet of the magnetic measuring device.

FIG. 10 is a semi-diagrammatic elevational view of a modified form of magnetic measuring apparatus of the present invention.

FIG. 11 is a semi-diagrammatic elevational view of another modified form of measuring apparatus of the present invention for continuous dimensional sampling and marking of moving sheet work.

FIG. 12 is a semi-diagrammatic elevational view of still another modified form of measuring apparatus of the present invention for indicating dimensional variations in moving sheet work which exceed both a minimum and a maximum value.

Referring in more detail to FIGS. 1 and 2, there is shown a magnetic measuring device constructed in accordance with the present invention intended for use in measuring dimensional run-out in one direction only; that is, to indicate whether or not a dimension of the object being measured exceeds a predetermined acceptable value. The device comprises a hollow frame 20 preferably cast of aluminum into a C-shaped configuration as viewed from the side. Frame 20 rests on a steel bottom plate 22 and is enclosed at the back and top by laminated plastic panels 24 and 26 respectively and at the front of the hollow overhanging portion 27 of the frame by another laminated plastic panel 28. A horizontal web 30 extending between the legs of frame 20 supports a rectangular block 32 having a round stepped plug 34 secured thereto which is removably received with a close fit in a center hole 36 of web 30. Block 32 is preferably made of cold rolled steel and the upper surface 38 thereof is machined and finished flat with a high degree of accuracy to provide a smooth and true supporting surface for the object to be measured.

A measuring probe 40 is mounted beneath the overhanging portion 27 of frame 20 for movement in the direction of the dimension to be measured, e.g., vertical movement perpendicular to surface 38. Probe 40 comprises a square shaft 42 with a round contact head 44 secured to the lower end thereof. Head 44 has a convex end surface 46 preferably made of hard wear resistant material for making point contact with the surface of the object being measured. Shaft 42 is slidably received with a close fit between a pair of guide blocks 46 and 48 bolted to the underside of portion 27 of the frame, block 46 being slotted to form a vertical guideway for shaft 42. The upper end of shaft 42 supports a stable ceramic type permanent magnet 50 of generally horseshoe configuration with north and south poles "N" and "S" oriented as illustrated in FIG. 2. A rubber washer 52 mounted on guide blocks 46, 48 serves as a cushion for magnet 50. A compression coil spring 54 encircles shaft 42 between the guide blocks and an adjustable collar 56 secured to shaft 42 therebelow for biasing probe 40 downwardly into contact with the object to be measured. A stop pin 57 is mounted on shaft 42 to limit upward travel of probe 40.

A magnetically controlled switch 58 is mounted in a fixed position spaced directly above magnet 50 in the hollow overhanging portion 27 of frame 20. Switch 58 is preferably a reed-type snap switch, such as that known commercially by the trademark GLASWITCH, model No. E-5600, and made by Revere Corporation of America of Wallingford, Conn. As shown diagrammatically in FIG. 3, switch 58 comprises a cylindrical glass envelope 60 with a pair of magnetically conductive flexible metal reeds 62 and 64 having thickened terminal portions 66 at the outer ends thereof secured in the sealed ends of envelope 60. Reeds 62, 64 extend inwardly of the envelope towards one another and terminate in a pair of contacts 68, 70 which overlap one another. The reeds 62, 64 are under a small but precise tension which hold contacts 68, 70 spaced from one another so that a small gap exists therebetween. Envelope 60 is filled with an inert atmosphere to protect the contact points, and only the terminals 66 of switch 58 extend beyond the sealed ends of the envelope 60. These terminals are soldered onto a pair of brass hangers 72 secured to fiber mounting blocks 74 by conductor screws 76. Screws 76 extend respectively through the opposite sides of frame 20 so as to provide terminal posts for electrically connecting an external circuit across reeds 62, 64, it being understood that screws 76 are suitably insulated from frame 20.

The top panel 26 of frame 20 supports a vernier selector dial 78 which is secured to a round vertical shaft 80 journalled in plate 26. A control magnet 82 is secured to the lower end of shaft 80 between plate 26 and switch 58 and directly opposite the specimen measuring magnet 50. Control magnet 82 is preferably identical to magnet 50 and is disposed with its north and south poles facing the poles of magnet 50. Magnet 82 may be rotated about the axis of shaft 80 by turning a control knob 84 affixed to the upper end of shaft 80. The periphery of dial 78 is marked off into angularly spaced graduations 86, and the upper surface of panel 26 adjacent thereto is similarly marked with reference markings (not shown) to provide a visual indication of the angular setting of control magnet 82.

A switch reset device is also mounted within a portion 27 of frame 20 and comprises a shaft 88 (FIG. 2) journalled in the sides of frame 20 and extending parallel to and spaced from switch 58. A pair of knobs 90 are secured to the opposite ends of shaft 88 outside frame 20 for manually rotating the shaft. A generally C-shaped shield 92 is supported by a radial arm 94 secured to shaft 88, shield 92 being designed to partially surround switch 58 when pivoted from the upright to the inclined positions indicated in broken lines in FIG. 1. Shield 92 is made of material having a low reluctance to magnetic fields of force, such as thin Mu-metal.

The operation of the above described magnetic measuring device is best understood by reference to the semi-diagrammatic views of FIGS. 3–9. Referring first to FIG. 3, a work piece 96, representing the object to be measured, is placed on surface 38 of table 32 and probe 40 is lowered into contact with the flat upper surface 98 of the work piece, the purpose being to determine if this surface is correctly dimensioned relative to the flat underside of the work. The work piece 96 may be initially positioned with probe 40 contacting surface 98 near the leading edge thereof, and then the work is advanced along table 32 in the direction of the arrow. As long as the vertical dimension defined by the distance between work surface 98 and table surface 38 remains constant, magnet 50 will not approach any closer to switch 58 than the position A illustrated in FIG. 3. In this position, the upper ends of the north and south poles of magnet 50 are spaced a predetermined distance A from switch 58.

The magnetic field generated by magnet 50 is illustrated by the flux lines 100 leaving the north pole and entering the south pole thereof. The flux pattern of magnet 50 is conventional for a horseshoe magnet configuration, with the flux lines becoming more greatly spaced from one another as their distance from the magnetic poles increases, thus illustrating the decrease in magnetic field strength or flux density with increasing distance from the poles. The flux pattern of magnet 50 fans out in the air so as to encompass switch 58 when the magnet is in position A, but when flux lines 100 reach reed 62 of the switch they enter and concentrate in the reed, and then complete a portion of their circuit back to the south pole by traveling through reed 62, contact 70, across the gap between contacts 60 and 78, through contact 68 and reed 64, from which they again enter the inert atmosphere in a distributed pattern as illustrated in FIG. 3. Due to the concentration of the flux lines in the reeds, the contacts 68, 70 effectively become north and south poles respectively and thus a magnetic force is generated between the contacts tending to draw them together against the tension of reeds 62 and 64. However, at position A of magnet 50 the flux density in the gap between the contacts is insufficient to produce a magnetic attraction therebetween sufficient to overcome reed tension and hence the contacts remain open.

As illustrated in FIG. 4, when the vertical dimension of work piece 96 exceeds the specified maximum run-out tolerance, such as when a protuberance 102 exists in upper surface 98, the moving work piece with push probe 40 upwardly until the poles of magnet 50 are spaced a predetermined precise distance B from switch 58 at which point the strength of the magnetic field is sufficient to cause contacts 68, 70 to close together. This may be visualized as the result of an increase in the number of flux lines 100 entering and leaving reeds 62 and 64 respectively, causing a correspondingly higher flux density across the contact gap. At the instant the contact gap is closed, many more lines of force traverse the closed gap due to the much lower magnetic reluctance of the contacts as compared to that of the inert atmosphere in envelope 60. As a result the contacts are held together by a much stronger attraction force than exists therebetween just prior to their closing, thereby insuring a rapid, positive closing action of the contacts.

It has been found that the closing of switch contacts 68, 70 occurs consistently precisely at the same point B in the travel of magnet 50 towards switch 58. The amount of such magnet movement required to close the contacts is measured in tenths of a thousandth of an inch. Thus the distance between positions A and B may be reduced to a conservative minimum value of .001 inch without altering the above switch closing effect of magnet 50, the magnetic measurement device thus being capable of measuring a protuberance 102 which projects only .001 inch above surface 98 of the work piece.

One system for indicating the closing of contacts 68, 70 is shown in FIGS. 3 and 4 and consists of an external circuit including a conventional alarm device 104 incorporating a light 106 and a horn 108 which are connected in series with leads 110 and 112 connected respectively to one terminal of a suitable power source and terminal 66 of reed 62 of switch 58. Terminal 66 of reed 64 and the other terminal of the power source may be grounded to complete the energizing circuit for alarm 104. When contacts 68, 70 close, current from the power source flows through reeds 62, 64, thereby energizing light 106 and horn 108 to give a visual and audible signal that dimensional run-out has been encountered in work piece 96.

The operation of control magnet 82 is best understood by referring to FIGS. 8 and 9. When magnet 82 is angularly adjusted as shown in FIG. 8 so that its north and south poles are respectively opposite the south and north poles of magnet 50, a majority of the flux lines 100 leaving the north pole of magnet 50 travel directly to and enter the south pole of magnet 82, and the same condition exists between the north pole of magnet 82 and the south pole of magnet 50. Those flux lines tending to enter and traverse reed 62 towards contact 70 are opposed by flux lines entering reed 64 from the north pole of magnet 82 so that a condition of repulsion between contacts 68 and 70 is created which is at a maximum when magnets 50 and 82 are equally spaced from the reeds and are of equal strength. When control magnet 82 is so aligned relative to magnet 50, it is necessary to move magnet 50 closer to reeds 62, 64 until the pole ends of magnet 50 reach the closing line 114 before its field strength is sufficiently strong enough to overcome the effect of the field of magnet 82 and close contacts 68, 70.

Referring to FIG. 9, when control magnet 82 is rotated 180 degrees from the position illustrated in FIG. 8 to thereby align the north poles and south poles of the respective magnets, the flux lines from both of the north poles enter and traverse reed 62, contacts 70, 68 and reed 64 in the same direction. This greatly increases the attraction between contacts 68, 70 and hence magnet 50 is effective at a greater distance (line 116) to close the contacts. Control magnet 82 thus provides a simple device for calibrating the measuring device, either for allowable tolerances or zero setting, since by merely turning knob 84 from zero to 180 degrees the switch activating position B may be located anywhere within the range indicated D in FIGS. 8 and 9. The vernier scale 86 on dial 78 may be calibrated directly in thousandths of an inch for convenience in setting the position of the maximum run-out line B.

While the final increment of switch-closing movement of magnet 50 is less than .001 inch, a much greater movement in the opposite direction is necessary to open or "reset" switch 58. Magnet 50 must be retracted past point A until its poles reach a precise point in their travel away from switch 58, indicated as reset position C in FIGS. 3 and 4, before the spring tension of reeds 62, 64 is sufficient to overcome the magnetic attraction between contacts 68, 70 to thereby open the contacts. However, the final increment of switch-opening movement of magnet 50, like the switch-closing movement thereof, is measured in micro-inches and hence also may be utilized, if so desired, for measuring purposes in accordance with the invention.

The gross resetting movement occurs automatically when work piece 96 is removed from table 32 since probe 40 can then return to the position indicated in FIGS. 1 and 2. However, shield 92 eliminates the need for removing the work piece in order to reset switch 58. As shown sequentially in FIGS. 5, 6 and 7, by rotating knob 90 clockwise as viewed in FIG. 5, the shield 92 may be pivoted from the inoperative position of FIG. 5 to the shielding position of FIG. 6 wherein it surrounds reeds 62 and 64 so as to provide a low reluctance path for the flux lines from both of the magnets 50, 82. Since these flux lines then traverse the shield rather than the reeds, the reed contacts are free to spring apart to their normal open position. Once the switch has been opened, shield 92 may be pivoted back to the inoperative position shown in FIG. 7 and the contacts will thereafter remain open until magnet 50 is again moved to position B by the occurrence of a dimensional run-out of .001 inch.

A modified form of magnetic measurement apparatus is shown in FIG. 10 which incorporates a control magnet 120 which functions to compensate for variations in the vertical dimension of the work resulting from a variable condition such as the temperature of the work piece 96. Magnet 120 is rotatably mounted in frame 20 in a manner similar to control magnet 82, but is automatically controlled instead of being manually adjustable. A magnet supporting shaft 122 is connected to an armature shaft 124 of a conventional servomechanism 126 which in turn is connected by leads 128 to a suitable telemetering device 130. Suitable temperature sensing apparatus (not shown) for measuring the temperature of work piece 96 as it passes under probe 40 is connected to telemetering device 130 which functions to convert this temperature reading into an electrical signal. This signal is fed via leads 128 to energize servomechanism 126 so that it rotates magnet 120 into a predetermined angular position relative to magnet 50. Expansion and contraction of the vertical dimension of work piece 96 from a predetermined dimension at a predetermined temperature may thus be effectively cancelled-out by so rotating magnet 120.

The device of FIG. 10 is calibrated by rotatably mounting switch envelope 60 in bearings 132 in the sides of frame 20 so that the entire switch assembly 58 may be rotated about the cylindrical axis thereof. A suitable vernier dial 134 is provided on one end of switch 58 to indicate angular adjustment of the switch. This rotation of switch 58 is effective to vary the distance B between magnet 50 and switch 58 at which magnet 50 will actuate the switch.

Another variable condition, such as a variation in the horizontal dimension of work piece 96, may be correlated with the vertical dimension being monitored by constructing control magnet 120 as an electromagnet with suitable magnetizing coils 136 and 138. One end of coil 136 is connected to one end of coil 138 by a jumper wire 140 and the other ends of the respective coils are connected via leads 142 and 144 with a D.C. amplifier 146. Amplifier 146 is controlled by a suitable device (not shown) for continuously measuring the horizontal dimension of work piece 96 and converting variations therein into an input signal for amplifier 146 which in turn generates an output signal the amplitude of which is proportional to such dimensional variations. The strength of the magnetic field generated by control magnet 120 is thus varied in accordance with horizontal dimensional variations of the work. For example, the maximum permissible vertical run-out in the work may be .001 inch in a portion of the work which is three inches wide, whereas the permissible vertical run-out may be .005 inch when the width of the work changes to 3½ inches. By suitable adjustment of the amplifier 146 the field strength of magnet 120 may be increased in response to this change in width of the work so that magnets must move .005 inch in order to actuate switch 58. Hence continuous monitoring may be achieved with the above automatic adjustment of control magnet 120.

Another modified form of measuring apparatus of the present invention is shown in FIG. 11 adapted for continuously monitoring moving material such as a ribbon 150 of sheet stock as it is drawn at a predetermined speed across table 32 by a suitable coiling mechanism 152. In this device the specimen measuring magnet 50 and control magnet 82 are inverted from their respective positions in the apparatus of FIGS. 1–9 but co-operate with switch 58 in the same manner. A modified form of probe is provided comprising a shaft 154 slidably mounted for vertical movement in a support 156, the upper end of shaft 154 being pivotably connected at 158 to a lever arm 160. Lever arm 160 is fulcrumed on support 156 at 162 and is pivotally connected at its outer end to magnet supporting shaft 42. Shaft 154 may be spring biased into monitoring contact with the sheet work in the manner of the measurement apparatus of FIGS. 1 and 2, but gravity is usually sufficient for this purpose. A constant speed electric motor 164 is mounted on support 156 and a cam 166 is secured eccentrically to the shaft 168 of the motor for rotation therewith. Cam 166 has a low point which permits head 44 to drop into monitoring contact with the sheet work once during each revolution of the cam, at which time lever 160 is supported solely by shaft 154 and support 156. If the vertical dimension of the work is less than a specified dimension, as determined by the setting of control magnet 82, the field from magnet 50 closes the contacts of switch 58, thereby energizing via leads 170 and 172 a conventional marker device 174 mounted beneath support 156 adjacent head 44. With this arrangement the work may be sampled at any desired rate, such as 10 times per second, and the work is automatically marked at those places where head 44 encounters "low spots." The gross lifting movement of cam 166 is sufficient to raise magnet 50 to the switch reset position C so that the dimensional sampling is cancelled with each reciprocation of shaft 154, thereby eliminating the need for a reset mechanism.

A further modified form of magnetic measurement apparatus of the persent invention is shown in FIG. 12. In this arrangement a modified frame 180 is provided having a support 182 secured thereto in which a probe comprising a shaft 184 is slidably mounted for vertical movement. A compression coil spring 186 is positioned between support 182 and contact head 44 for pressing the head into contact with the moving ribbon 150. The upper end of shaft 184 is pivotably connected to the outer end of a lever 188 which is fulcrumed at 190 on the side of frame 180 and extends therethrough into the frame. The inner end of lever 188 supports a pair of work magnets 192 and 194 mounted back-to-back thereon in a balanced suspension with shaft 184 and head 44. A pair of magnetically actuated switches 196 and 198 are mounted in frame 180 respectviely above and below magnets 192 and 194. A pair of control magnets 200 and 202 are mounted respectively in the upper and lower ends of frame 180 for calibrating the respective dimensional run-out positions B of magnets 192 and 194 in the manner previously described in connection with control magnet 82. With this arrangement switch 198 is actuated when the vertical thickness of ribbon 150 exceeds a predetermined maximum value while switch 196 is actuated by magnet 192 when the vertical thickness of ribbon 150 decreases below a predetermined minimum value.

These conditions are visiually and audibly indicated by suitable minimum and maximum alarm devices 204 and 206 respectively. As will be apparent from the circuit diagram of FIG. 12, minimum alarm 204 is connected in parallel through switch 196 with a power source, while maximum alarm 206 is connected in parallel with the power source via switch 198. In addition, switches 196 and 198 are separately connected via leads 208 and 210 with the respective coils of a bifilarly wound relay 212 so that the occurrence of either minimum or maximum dimensional run-out in the work will cause relay 212 to be energized by the power source. The normally closed contact terminals of relay 212 are connected in series circuit with the power leads 214 of the electric motor drive 216 of the sheet work coiling mechanism 152. Hence the sheet work is automatically stopped whenever minimum or maximum dimensional run-out occurs.

It is to be noted that the magnetic measuring apparatus of FIG. 12 as well as the previously described embodiments of the present invention are capable of directly controlling a heavy duty relay, such as relay 212, which in turn is capable of controlling over ½ horsepower of electrical energy between "on" and "off" conditions. This is achieved without the use of complicated electrical apparatus and circuitry since the magnetically actuated switches 58, 196, 198 are available with sufficient power ratings to be connected directly in circuit with the alarm and relay devices and yet are sensitive enough to be actuated by micro-inch movement of the work magnets. Due to the sensitivity of the magnetic switches, the magnet and switch assembly is preferably enclosed by magnetic shielding material such as thin Mu-metal.

It is to be understood that more than one magnetic control field may be provided for determining the required travel of the work magnet 50 necessary to cause switch 58 to operate. Thus a multiplicity of control magnets 82 or 120 may be incorporated in the device so that each control magnet must be in some predetermined position before the work magnet 50 can activate the switch 58. Moreover, electromagnet 120 may be employed to compensate for several variable conditions by connecting it to a suitable D.C. amplifying device operable to produce an output signal which is a function of several input signals each corresponding to one of the variable conditions.

It is also within the scope of the present invention to utilize the magnetic measurement apparatus thereof in such a way that the closing of switch contacts 68 and 70 directly indicates an acceptable dimensional condition of the work rather than dimensional run-out. For instance, referring to the device of FIG. 11, control magnet 82 can be adjusted such that when head 44 is dropped into contact with work 150 magnet 50 will close switch 58 if the vertical thickness of the work is equal to or less than a specified dimension. In this case the work would be marked by marker 174 to indicate that it is within acceptable dimensional tolerances. However, if work 150 were too thick when contacted by head 44, switch 58 would remain open and the absence of a mark would then indicate a high spot in the work.

What is claimed is:

1. Apparatus for measuring a predetermined dimensional variation in one surface of an object relative to a reference surface comprising a frame adapted to be positioned a fixed distance from the reference surface, a probe mounted on said frame for movement relative to said object in the direction of the dimension to be measured and adapted to contact said one surface of the object, means for generating a magnetic field within an environment surrounded by said frame, switch means mounted in said frame and having a pair of contacts disposed within the flux pattern of said magnetic field, said contacts being operable to close in response to the existence of a predetermined flux density in the gap between the contacts, one of said field generating and switch means being connected to said probe for movement within said frame proportional to the movement of said probe, said switch means operating in response to said one means reaching a predetermined point in its travel relative to the other of said means in response to movement of said probe caused by the probe sensing the occurrence of the predetermined dimensional variation in the object, and a control magnet mounted in said frame and positioned therein such that the flux pattern thereof encompasses said switch means, said control magnet and said switch means being mounted for relative rotation to vary the interaction of the respective flux patterns of said control magnet and said means for generating a magnetic field to thereby adjust the distance which said last mentioned means must be from said switch means in order to close said switch contacts.

2. The combination set forth in claim 1 wherein said control magnet comprises a stable permanent magnet.

3. Apparatus for measuring a predetermined dimensional variation in one surface of an object relative to a reference surface comprising a frame adapted to be positioned a fixed distance from the reference surface, a probe mounted on said frame for movement relative to said object in the direction of the dimension to be measured and adapted to contact said one surface of the object, means for generating a magnetic field within an environment surrounded by said frame, switch means mounted in said frame and having a pair of contacts disposed within the flux pattern of said magnetic field, said contacts being operable to close in response to the existence of a predetermined flux density in the gap between the contacts, one of said field generating and switch means being connected to said probe for movement within said frame proportional to the movement of said probe, said switch means operating in response to said one means reaching a predetermined point in its travel relative to the other of said means in response to movement of said probe caused by the probe sensing the occurrence of the predetermined dimensional variation in the object, and a lever arm fulcrumed on said frame, said magnetic field generating means comprising first and second magnets, said magnets being mounted back-to-back on said arm for movement therewith within said frame, said probe being pivotally connected to said arm to pivot the same about the fulcrum axis thereof, said switch means comprising first and second switches fixed in predetermined positions respectively opposite said first and second magnets and each being operable to close when the associated magnet reaches a predetermined point in its movement toward the same, the movement of said magnets being correlated with the movement of said probe such that said predetermined closing points correspond to the minimum and maximum allowable dimensional run-out of the object being measured.

4. The combination set forth in claim 3 including circuit means connected respectively to said first and second switches operable to indicate the occurrence of minimum and maximum run-out in response to the closing of said respective switches.

5. A device for measuring variations from a predetermined dimension of an object which varies in said dimension as a function of a variable condition such as the temperature of the object or another dimension thereof, said device comprising a frame fixed with respect to a support adapted to receive the object, a probe mounted in said frame for movement in the direction of the dimension to be measured and adapted to contact the surface of the object defining said dimension relative to the support, magnetic means connected to said probe for movement within said frame proportional to the movement of said probe, circuit means including a magnetically actuated switch mounted in said frame within the flux pattern of said magnetic means, said switch operating in response to said magnetic means reaching a predetermined point in its travel relative to said switch, a control magnet positioned in said frame so that the flux pattern thereof encompasses said switch, and means for controlling said control magnet to vary the flux density in the area of said switch as a function of said variable condition to thereby effectively cancel out the variation in said dimension of the object resulting from said variable condition.

6. The combination set forth in claim 5 wherein said control magnet is rotatably mounted within said frame for rotating the flux pattern thereof relative to said switch, said means controlling said control magnet comprising a servomechanism connected to said control magnet for rotating the same and second circuit means connected to said servomechanism for angularly positioning said control magnet in response to variations in said variable condition such that the interaction of the control magnet flux pattern with the flux pattern of said magnetic means effectively cancels out the variation in said dimension of the object resulting from said variable condition.

7. The combination set forth in claim 5 wherein said control magnet comprises an electromagnet and said means controlling said control magnet comprises second circuit means connected to said electromagnet for varying the magnetizing current thereof so as to vary the flux pattern thereof in response to variations in said variable condition such that the interaction of the control magnet flux pattern with the flux pattern of said magnetic means effectively cancels out the variation in said dimension of the object resulting from said variable condition.

8. The combination set forth in claim 5 wherein said magnetically actuated switch comprises a reed-type switch and an air-tight casing enclosing said switch, said switch having a pair of reeds respectively supported at the opposite ends of said casing and extending towards one another, said reeds each having a contact normally spaced from the other contact and operable to close together in response to a predetermined field strength from said magnetic means acting on said reeds, said switch casing being rotatably mounted in said frame such that said reeds are rotatable about the rotational axis of the casing for angular adjustment relative to said magnetic means.

9. The combination set forth in claim 5 wherein said control magnet is positioned in said frame for movement relative to said switch and said controlling means varies the flux density in the area of said switch by moving said control magnet.

10. Apparatus for monitoring dimensional run-out in moving strip material or the like comprising a support for supporting the material as it moves thereacross with a reference surface of the material contacting the support, a frame fixed with respect to the support, a probe mounted on said frame for movement in the direction of the dimension of the material to be monitored and adapted to yieldably contact a surface of the material defining the monitored dimension thereof relative to said reference surface, an arm pivotally connected at spaced points therealong to said frame and said probe respectively, a magnet connected to said arm for movement therewith, a magnetically actuated switch mounted on said frame within the flux pattern of said magnet, said switch being fixedly positioned to operate in response to said magnet reaching a predetermined point in its travel relative to said switch in response to movement of said probe caused by the contact thereof with a predetermined dimensional run-out in said monitored surface of the material, circuit means connected to said switch for indicating the occurrence of run-out in response to the operation of said switch, a cam mounted for rotation about an axis thereof, said cam having a camming surface engaging said arm to pivot the same about the pivotal connection of said arm with said frame to thereby move said probe into and out of monitoring contact with said monitored surface of the material, and means for rotating said cam at a predetermined speed correlated with the rate of feed of the material to thereby monitor the material at predetermined intervals.

11. Apparatus for measuring a predetermined dimensional variation in one surface of an object relative to a reference surface comprising a frame adapted to be positioned a fixed distance from the reference surface, a probe mounted on said frame for movement relative to said object in the direction of the dimension to be measured and adapted to contact said one surface of the object, means for generating a magnetic field within an environment surrounded by said frame and switch means mounted in said frame and having a pair of contacts disposed within the flux pattern of said magnetic field, said contacts being operable to close in response to the existence of a predetermined flux density in the gap between the contacts, one of said field generating and switch means being connected to said probe for movement within said frame proportional to the movement of said probe, said switch means operating in response to said one means reaching a predetermined point in its travel relative to the other of said means in response to movement of said probe caused by the probe sensing the occurrence of the predetermined dimensional variation in the object, said magnetic field generating means comprising first and second magnets, means mounting said magnets in back-to-back relationship for co-movement within said frame, said probe being operatively connected to said magnets to move said magnets in response to dimensional variations of said object, said switch means comprising first and second switches fixed in predetermined positions respectively opposite said first and second magnets and each being operable to close when the associated magnet reaches a predetermined point in its movement toward the same, the movement of said magnets being correlated with the movement of said probe such that said predetermined closing points correspond to the minimum and maximum allowable dimensional run-out of the object being measured.

12. Apparatus for measuring a predetermined dimensional variation in one surface of an object relative to a reference surface comprising a frame adapted to be positioned a fixed distance from the reference surface, a probe mounted on said frame for movement relatvie to said object in the direction of the dimension to be measured and adapted to contact said one surface of the object, means for generating a magnetic field within an environment surrounded by said frame, switch means mounted in said frame and having a pair of contacts disposed within the flux pattern of said magnetic field, said contacts being operable to close in response to the existence of a predetermined flux density in the gap between the contacts, one of said field generating and switch means being connected to said probe for movement within said frame proportional to the movement of said probe, said switch means operating in response to said one means reaching a predetermined point in its travel relative to the other of said means in response to movement of said probe caused by the probe sensing the occurrence of the predetermined dimensional variation in the object, and including means for resetting said switch means after said switch means has been operated, said switch resetting means comprising a shield made of magnetic shielding material, said shield being movably mounted within said frame for movement to and from a switch shielding position wherein said shield intersects the magnetic lines of force traversing the space between said magnetic field generating means and said switch means.

References Cited by the Examiner

UNITED STATES PATENTS 2,289,830    7/1942    Ellwood _____ 200—104
2,399,113    4/1946    Guenther.

(Other references on following page)

UNITED STATES PATENTS

| | | | |
|---|---|---|---|
| 2,597,831 | 5/1952 | Willis | 177—210 |
| 2,657,342 | 10/1953 | Stem | 317—159 |
| 2,681,566 | 6/1954 | Ruge. | |
| 2,707,333 | 5/1955 | Schaurte | 33—147 |
| 2,877,361 | 3/1959 | Chase | 340—274 X |
| 2,924,682 | 2/1960 | Winterburn | 200—87.3 |
| 2,932,089 | 4/1960 | Dexter et al. | 33—147 |
| 2,973,414 | 2/1961 | Bossemeyer | 200—87.3 X |
| 3,009,033 | 11/1961 | Werts | 200—87.3 |

FOREIGN PATENTS 724,194  10/1951  Great Britain.

ROBERT B. HULL, *Primary Examiner.*

ISAAC LISANN, *Examiner.*

W. KICE, N. MARTIN, *Assistant Examiners.*